J. L. HUDSON.
TOOL-HANDLE.
No. 192,261. Patented June 19, 1877.
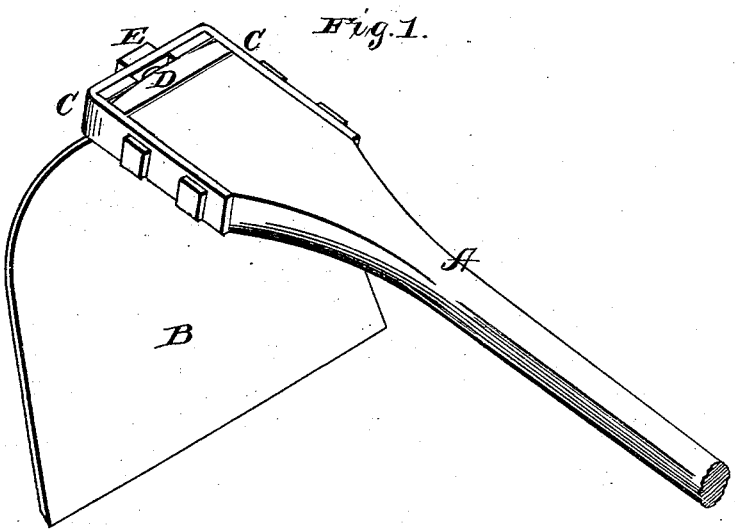
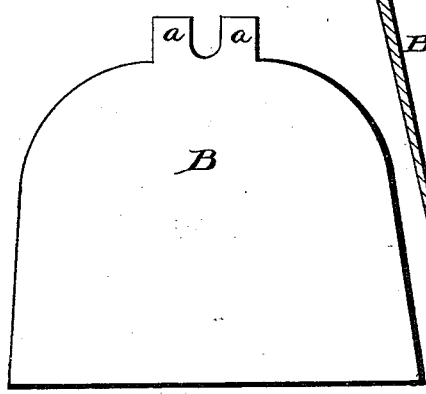
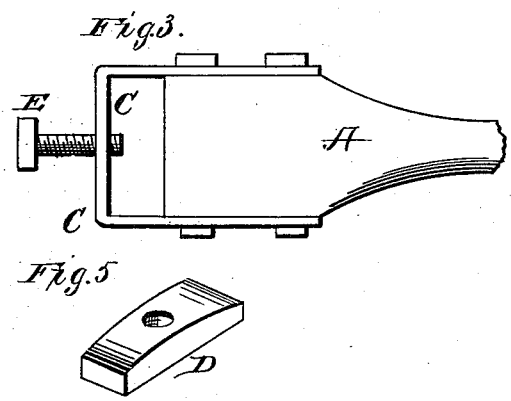
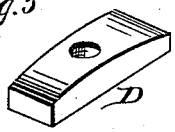
WITNESSES
INVENTOR
John L. Hudson
Alexander Mason
ATTORNEYS.

UNITED STATES PATENT OFFICE.

JOHN L. HUDSON, OF CUMMING, GEORGIA.

IMPROVEMENT IN TOOL-HANDLES.

Specification forming part of Letters Patent No. 192,261, dated June 19, 1877; application filed April 12, 1877.

*To all whom it may concern:*

Be it known that I, JOHN L. HUDSON, of Cumming, in the county of Forsyth, and in the State of Georgia, have invented certain new and useful Improvements in Hoes; and do hereby declare that the following is a full, clear, and exact description thereof, reference being had to the accompanying drawings, and to the letters of reference marked thereon, making a part of this specification.

The nature of my invention consists in the construction and arrangement of a device connected to hoe-handles, whereby a hoe or rake or other similar cultivating-tool may be readily attached or detached, as will be hereinafter described.

To enable those skilled in the art to make and use my invention, I will now proceed to describe its construction and operation.

In the accompanying drawings, making part of this specification, Figure 1 represents a perspective view; Fig. 2, a longitudinal section; and Figs. 3, 4, and 5 are detached portions.

In the figures, A represents the hoe-handle, which is enlarged, as seen at its outer end. C represents a metallic bar, which is secured by bolts to the edges of the handle-head, forming a loop, or leaving a space between the end of the handle and the outer face of the bar.

Within this space is placed a movable nut, D, and through the center of the outer side of the bar C is passed a screw-bolt, E.

B represents the hoe-blade, which is provided at its upper end with two upwardly-projecting ears, $a\ a$. These ears pass into the loop at the end of the handle, and between the nut D and the outer side of bar C. The opening between the ears allows the screw E to pass between them.

When the ears $a\ a$ are placed in the loop and the screw E is turned the nut D clamps the said ears tightly between it and the bar C, and thus secures the hoe in position.

Any form of hoe or rake may be provided with similar ears, and clamped upon the handle in similar manner.

One handle may thus be made to answer for a number of different farming implements, which may be attached and detached in a moment.

Having thus fully described my invention, what I claim as new, and desire to secure by Letters Patent, is—

The handle A, with its bar C, in combination with the implement provided with ears or equivalent, and the nut D and screw E, as and for the purpose specified.

In testimony that I claim the foregoing I have hereunto set my hand this 4th day of April, 1877.

JOHN L. HUDSON.

Witnesses:
 IRA R. HUDSON,
 R. E. SMITH.